(12) United States Patent
Hirata et al.

(10) Patent No.: US 7,236,189 B2
(45) Date of Patent: Jun. 26, 2007

(54) DIGITAL CAMERA AND METHOD OF IMAGE PROCESSING

(75) Inventors: Makoto Hirata, Osaka (JP); Takeki Kageyama, Osaka (JP)

(73) Assignee: Sanyo Electric Co., Ltd., Moriguchi-shi (JP)

(*) Notice: Subject to any disclaimer, the term of this patent is extended or adjusted under 35 U.S.C. 154(b) by 652 days.

(21) Appl. No.: 10/220,286

(22) PCT Filed: Mar. 7, 2001

(86) PCT No.: PCT/JP01/01790

§ 371 (c)(1),
(2), (4) Date: Sep. 10, 2002

(87) PCT Pub. No.: WO01/67747

PCT Pub. Date: Sep. 13, 2001

(65) Prior Publication Data

US 2003/0020815 A1    Jan. 30, 2003

(30) Foreign Application Priority Data

Mar. 10, 2000  (JP) .............................. 2000-067580

(51) Int. Cl.
*H04N 5/228* (2006.01)
(52) U.S. Cl. .................................................. 348/222.1
(58) Field of Classification Search ..................... None
See application file for complete search history.

(56) References Cited

U.S. PATENT DOCUMENTS 5,153,730 A * 10/1992 Nagasaki et al. ......... 348/231.6
5,633,976 A * 5/1997 Ogino ......................... 386/120
5,867,214 A * 2/1999 Anderson et al. ......... 348/231.6
6,415,102 B1* 7/2002 Fujii et al. ................... 386/117
6,919,926 B1* 7/2005 Sato ........................ 348/231.99

FOREIGN PATENT DOCUMENTS

| JP | 6-86203 | 3/1994 |
| JP | 11-298831 | 10/1999 |
| JP | 11-331759 | 11/1999 |
| JP | 11-331762 | 11/1999 |
| JP | 2000-41213 | 2/2000 |
| JP | 2000-98443 | 4/2000 |

OTHER PUBLICATIONS

Machine Translation of JP A H11-331762, Nov. 30, 1999.*

* cited by examiner

*Primary Examiner*—Ngoc-Yen Vu
*Assistant Examiner*—Dillon Durnford-Geszvain
(74) *Attorney, Agent, or Firm*—Westerman, Hattori, Daniels & Adrian, LLP.

(57) ABSTRACT

A digital camera includes a first CPU 21 and a second CPU 22. The first CPU 21 determines an operation of a release button 7 which instructs to photograph an object, and a photographing request is issued when the release button 7 is operated. On the other hand, the second CPU 22 photographs the object by driving a CCD imager 1 when the photographing request is issued, and stores image data of the object photographed into an SDRAM 4 in a compressed state. The second CPU 22 further records into a memory card 4 compressed image data stored in the SDRAM 4 predetermined amount by predetermined amount, and determines whether or not the photographing request is issued every time that a recording of the predetermined amount is completed.

6 Claims, 4 Drawing Sheets

DIGITAL CAMERA AND METHOD OF IMAGE PROCESSING

TECHNICAL FIELD

The present invention relates to a digital camera and an image processing method thereof. More specifically, the present invention relates to a digital camera and an image processing method thereof which store into an internal memory image data of an object photographed in response to an operation of a shutter button, record in a recording medium the image data in the internal memory predetermined amount by predetermined amount, and determine whether or not a release button is operated every time that a recording of the predetermined amount is completed.

PRIOR ART

In recent years, a digital camera which photographs an object by an image sensor such as a CCD imager, and etc, and records still image data of the object photographed into a detachable recording medium in a compressed state is praisefully used. However, there is a digital camera which requires a processing time of several seconds or so from photographing of the object to a completion of recording the still image data so that it is not possible to operate the release button during this processing time. In such the digital camera, there is a problem to miss a perfect moment for a good picture. It is noted that most of the processing time was spent not on a generating process of the still image data or a compressing process of generated still image data but on a recording process of the compressed image data into the recording medium.

Accordingly, in a conventional digital camera which found a solution to take a good picture in a perfect moment, following processings are carried out when a specific photographing mode (immediate photographing mode) is set. When the release button is operated, firstly, a generating process of one frame of the still image data and a compressing process of the generated still image data are performed, and the compressed image data is temporarily stored in a SDRAM. A recording process of the compressed image data stored in the SDRAM into the recording medium is carried out predetermined amount by predetermined amount, and it is determined whether or not the release button is operated every time that the recording of the predetermined amount is completed. When the release button is operated, newly generated compressed image data is stored in the SDRAM by the generating process and the compressing process described above.

A specific operation at this time is described by reference to FIG. 4. A mode change switch 9, for changing a photographing mode between a normal photographing mode and an immediate photographing mode and a release button 7 are connected to a first CPU 8. The first CPU 8 applies a corresponding state signal to a second CPU 10 when the mode change switch 9 or the release button 7 is operated.

If the release button 7 is operated in a state that the normal photographing mode is selected, the second CPU 10 activates a CCD imager 1. One frame of a raw image signal is output from the CCD imager 1. The raw image signal is input into a signal processing circuit 3 as raw image data via an A/D converter 2. The signal processing circuit 3 applies to the input raw image data processes such as a color separation, a YUV conversion, and so on, and writes into an image data storing area 4a of an SDRAM 4 through a memory control circuit 5 still image data of a YUV format thus generated.

An image compressing circuit 6 reads out the still image data stored in the image data storing area 4a through the memory control circuit 5, and compresses the read still image data according to a JPEG format. The compressed image data is written into a compressed data storing area 4b of the SDRAM 4 through the memory control circuit 5. When one frame of the compressed image data is obtained in the compressed data storing area 4b, the second CPU 10 reads out the compressed image data through the memory control circuit 5, and records the read compressed image data into a detachable memory card (semiconductor memory) 11.

On the other hand, if the release button 7 is depressed in a state that the immediate photographing mode is selected, a process until the compressed image data is written in the compressed data storing area 4b (defined as a photographing process) is the same as above. However, following processes are carried out in recording the compressed image data into the memory card 11.

The CPU 10 issues an inquiry signal to the first CPU 8 at a time that the one frame of the compressed image data is retained in the compressed data storing area 4b. The first CPU 8 determines whether or not the release button 7 is operated in response to the inquiry signal, and sends back a determination result to the second CPU 10. When the determination result indicates "no operation", the second CPU 10 reads out the compressed image data retained in the compressed data storing area 4b by a predetermined amount smaller than one frame of a data amount, and records in the memory card 11 the read compressed image data of the predetermined amount.

Upon completion of recording the predetermined amount, the CPU 10 outputs the inquiry signal once again to the first CPU 8. If the determination result sent back in response thereto is "operated", the second CPU 10 interrupts the recording process so as to carry out a photographing process, and retains newly generated compressed image data into the compressed data storing area 4b.

Thus, in the immediate photographing mode, it is determined whether or not the release button 7 is operated every time that the recording of the compressed image data of the predetermined amount is completed, and the photographing process was carried out instead of the recording process when the release button 7 is operated.

However, it is necessary that the inquiry signal is output from the second CPU 10 toward the first CPU 8, and the determination result is sent back from the first CPU 8 in order to determine whether or not the release button 7 is operated. Two CPUs are concerned regarding a generation of the inquiry signal and a sending back of the determination result so that it takes time for an operation determination of the release button 7. Consequently, this gave rise to a problem that a total time for a recording process of the compressed image data became prolonged if the determination result of the release button 7 is often carried out, and a responsive characteristic of the release button 7 deteriorates if the number of the determination result of the release button 7 is decreased.

SUMMARY OF THE INVENTION

Therefore, it is a primary object of the present invention to provide a digital camera capable of shortening a required time for a recording process of image data, and improving a responsive characteristic toward a photographing instruction.

It is another object of the present invention to provide an image processing method of a digital camera capable of shortening a required time for a recording process of the image data, and improving a responsive characteristic toward a photographing instruction.

A digital camera according to the present invention, comprises: an instruction key for instructing to photograph an object; a first CPU which carries out a first determination process for determining whether or not the instruction key is operated and an issuing process which issues a photographing request when it is determined that the instruction key is operated; and a second CPU which carries out a photographing process for photographing the object when it is determined that the photographing request is issued, a storing process for storing into a buffer memory image data of the object photographed, a recording process for recording the image data stored in the buffer memory into a recording medium predetermined amount by predetermined amount which is smaller than one screen of a data amount, and a determination process for determining whether or not the photographing request is issued every time that a recording of the image data of the predetermined amount is completed.

The first CPU determines whether or not an instruction key for instructing to photograph an object is operated and issues a photographing request when the instruction key is operated. On the other hand, the second CPU photographs the object when the photographing request is issued, stores image data of the object photographed into a buffer memory. Furthermore, the second CPU records into a recording medium the image data stored in the buffer memory predetermined amount by predetermined amount, and determines whether or not the photographing request is issued every time that a recording of the predetermined amount is completed.

Thus, the first CPU issues the photographing request by itself. Therefore, the second CPU does not require more than to determine whether or not the photographing request is issued so that a required time for determining whether or not the instruction key is operated is shortened. Consequently, it is possible to shorten a required time for a recording process of the image data, and also improve a responsive characteristic toward the photographing instruction.

In a preferred embodiment, the second CPU determines whether or not the photographing request is issued according to an aforementioned manner when a specific photographing mode is selected by the selection key.

In another preferred embodiment, the second CPU acquires an initiative when the photographing request is issued, and applies the initiative to the first CPU after completing storing the image data into the buffer memory. Thus, the acquiring the initiative is performed by the second CPU. The first CPU carries out an operation determination process of the instruction key and an issuing process of the photographing request when the initiative is applied.

In still another preferred embodiment, the image data of the object photographed is stored into the buffer memory in a compressed state.

In yet still another preferred embodiment, the recording medium is detachable.

According to the present invention, an image processing method of a digital camera provided with a first CPU and a second CPU, wherein the first CPU determines whether or not an instruction key for instructing to photograph an object is operated and issues a photographing request when it is determined that the instruction key is operated, and the second CPU photographs the object when it is determined that the photographing request is issued, stores image data of the object photographed into a buffer memory, records into a recording medium the image data stored in the buffer memory predetermined amount by predetermined amount which is smaller than one screen of a data amount, and determines whether or not the photographing request is issued every time that a recording of the image data of the predetermined amount is completed.

Since the first CPU 21 issues the photographing request by itself, and the second CPU does not require more than to determine whether or not the photographing request is issued, so that a required time for determining whether or not the instruction key is operated is shortened. As a consequence, it is possible to shorten a required time for the recording process of the image data, and it is also possible to improve a responsive characteristic toward the photographing instruction.

The above described objects and other objects, features, aspects and advantages of the present invention will become more apparent from the following detailed description of the present invention when taken in conjunction with the accompanying drawings.

BEST FORM FOR PRACTICING THE INVENTION

Figure 1:
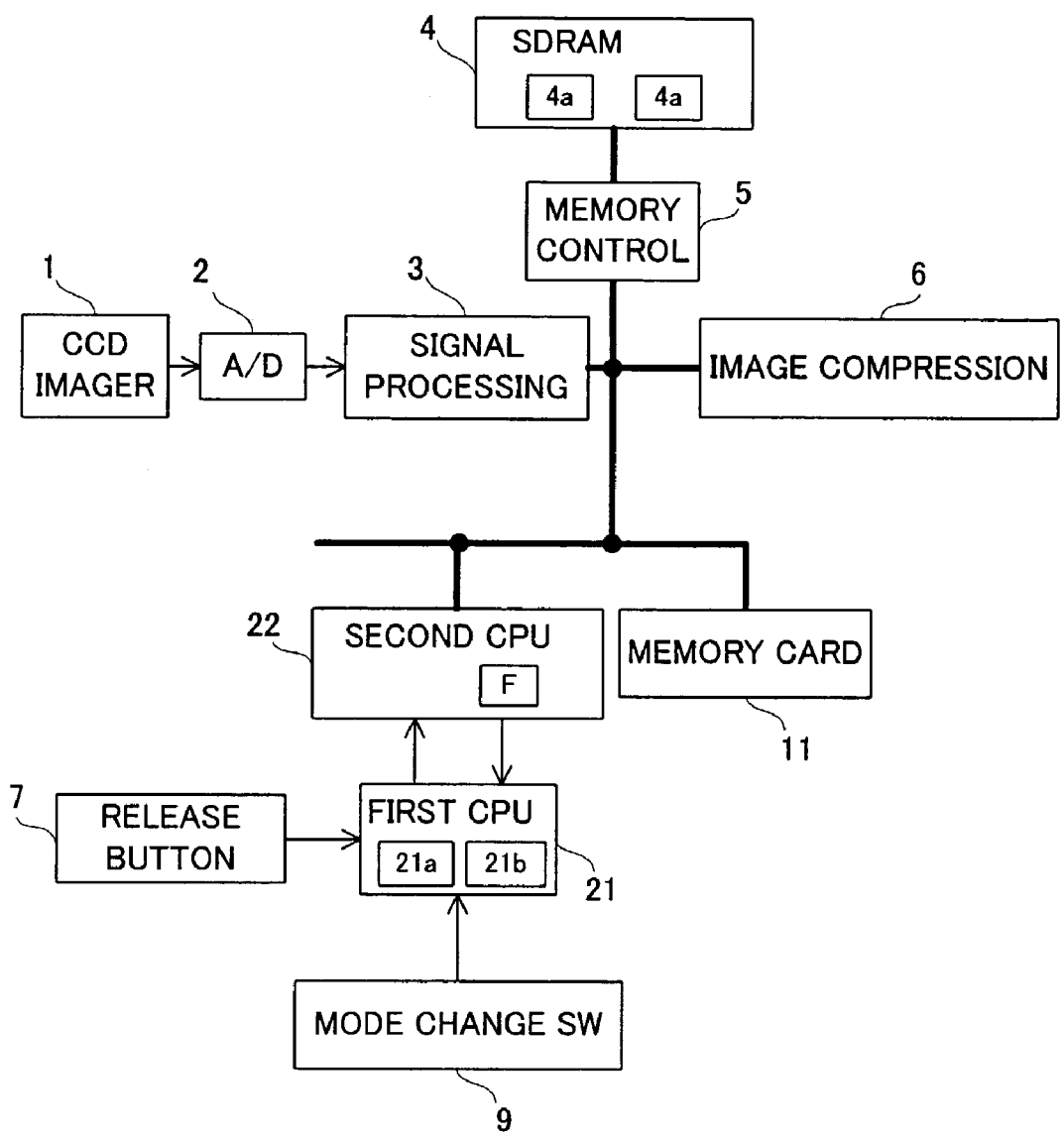
FIG. 1 is a block diagram showing a configuration of one embodiment of the present invention.
Figure 2:
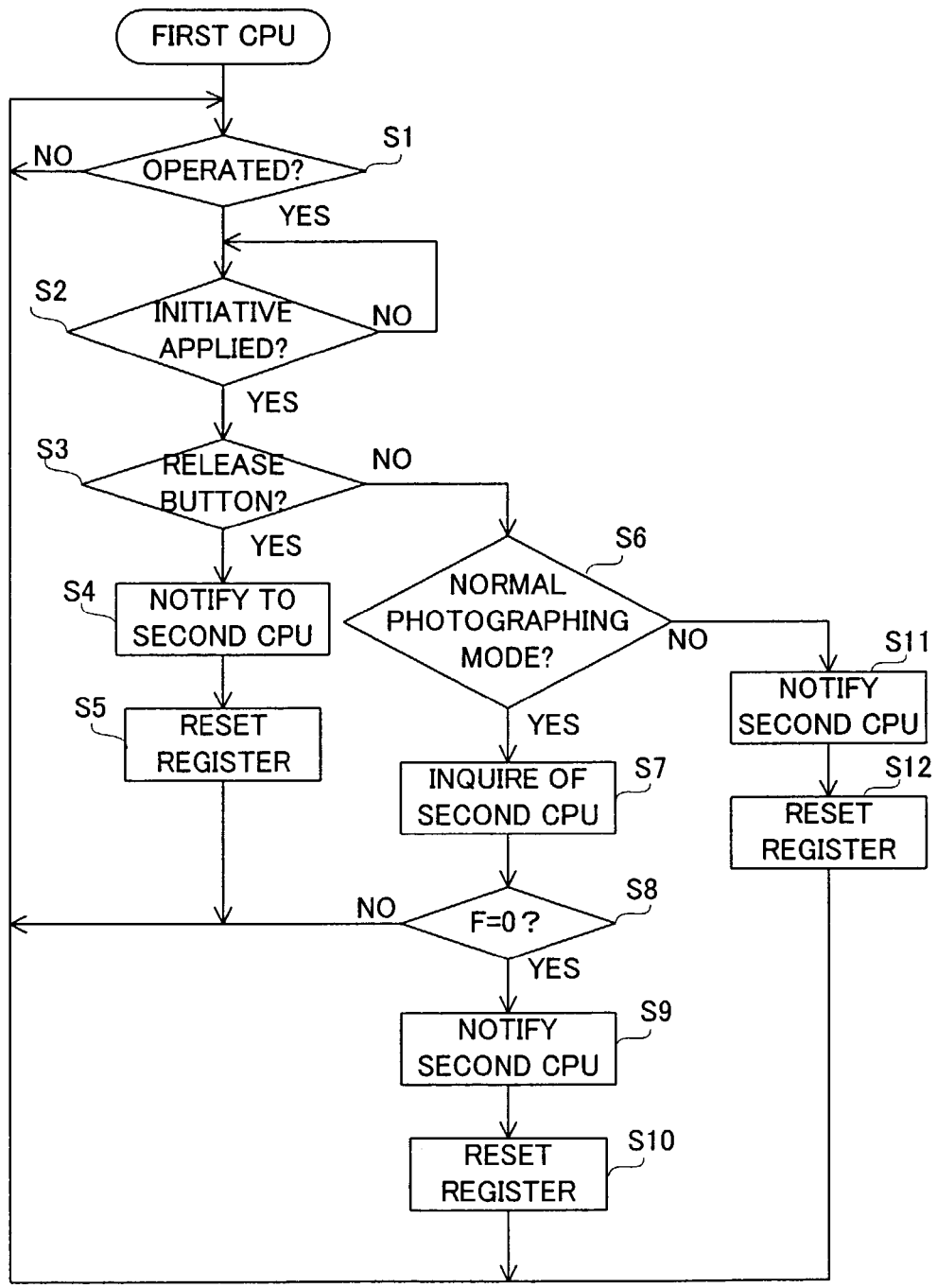
FIG. 2 is a flowchart showing one portion of an operation of a first CPU.
Figure 3:
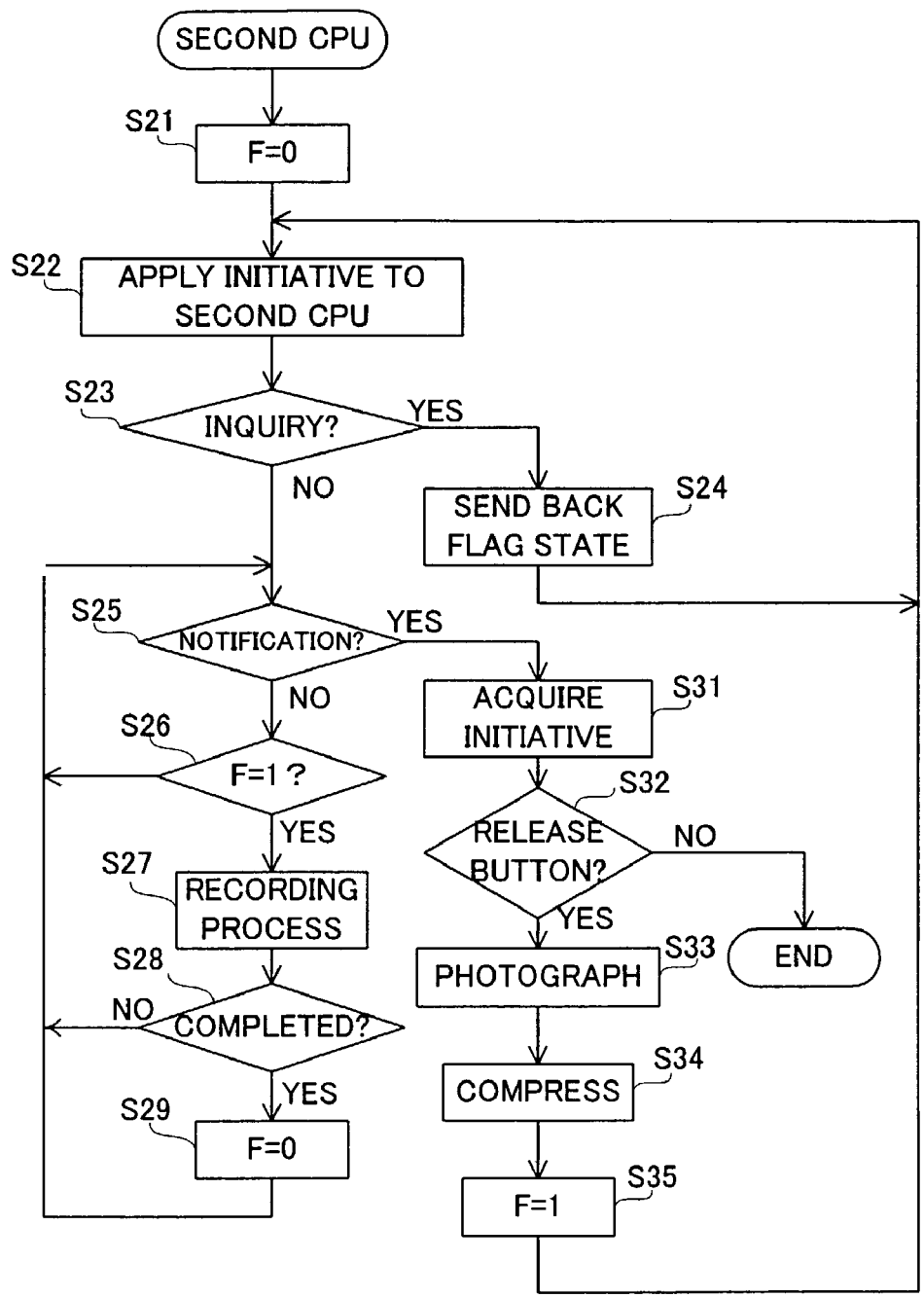
FIG. 3 is a flowchart showing one portion of an operation of a second CPU.
Figure 4:
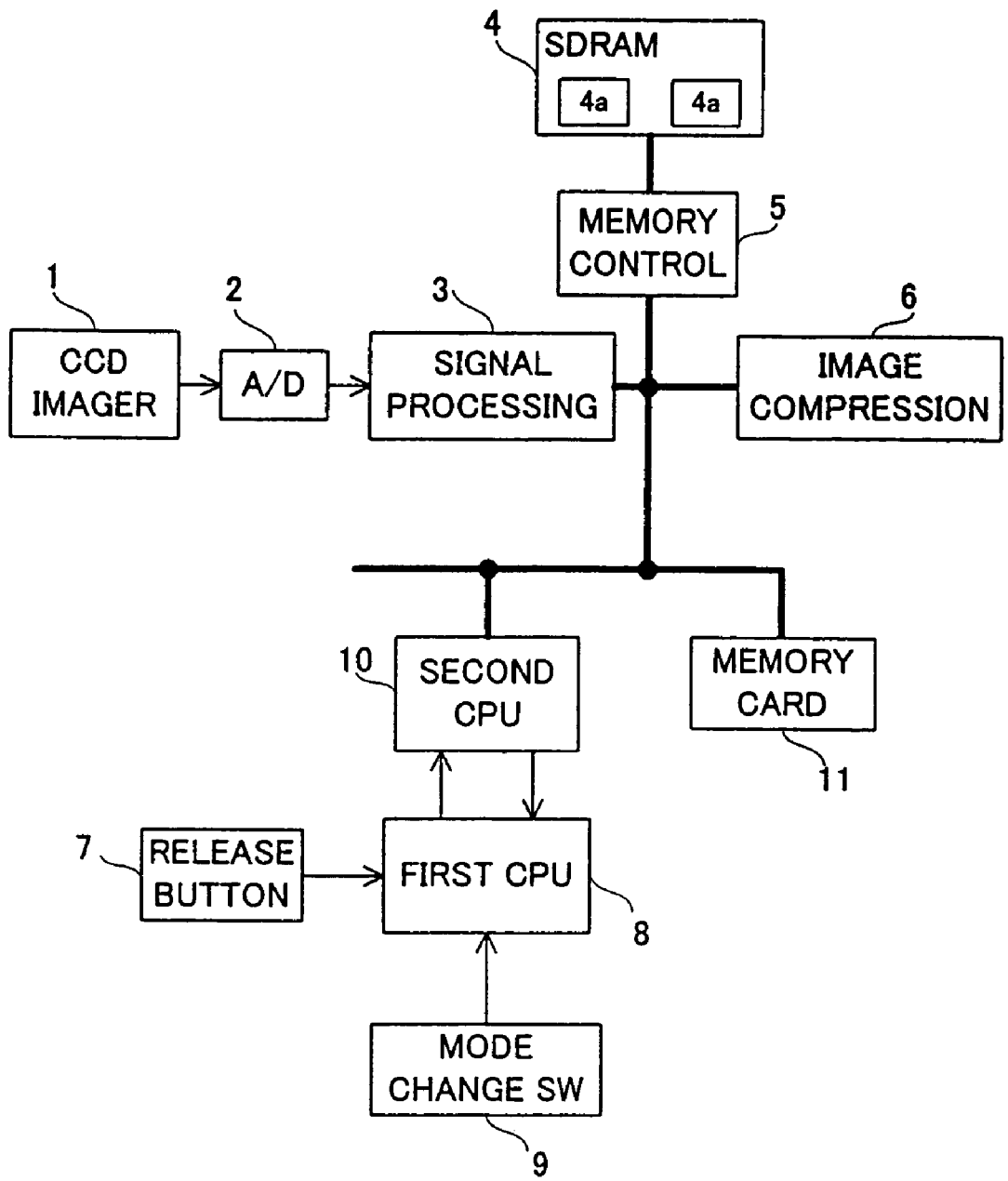
FIG. 4 is a block diagram showing a configuration of a prior art.

By reference to FIG. 1, a digital camera in this embodiment is the same as a prior art shown in FIG. 4 except that a first CPU 21 processes a flowchart shown in FIG. 2 and a second CPU 22 processes a flowchart shown in FIG. 3 so that a portion of duplicated descriptions common to the prior art is omitted. It is noted that FIG. 3 shows a process of the second CPU 22 when an immediate photographing mode is selected.

Firstly, by reference to FIG. 2, a process of the first CPU 21 is described. In a step S1, it is determined whether or not an operation of a release button 7 or a mode change switch 9 is operated by reference to a register 21a of one bit which retains an operating state of the release button 7 and a register 22b of two bits which retains a changing state of the mode change switch 9.

While a setting value of the register 21a indicates "0" if the release button 7 is turned off, the setting value of the register 21a is renewed from "0" to "1" if the release button 7 is turned on. In addition, the setting value of the register 21b is renewed from "00" to "01" or "11" when the photographing mode is changed, and restored to "00" when a changing of the photographing mode is notified to the second CPU 22. "01" is a value set when a normal photographing mode is changed to an immediate photographing mode, and "11" is a value set when changed to the normal photographing mode from the immediate photographing mode.

Due to this, it is determined that the key is operated in the step S1 when the setting value of the register 21a shows "1" or the setting value of the register 21b shows "01" or In a succeeding step S2, it is determined whether or not an initiative is applied from the second CPU 22. Giving and losing the initiative is carried out by the first CPU 21. More specifically, the initiative is applied to the first CPU 21 in a step S22 described later, and the initiative is lost from the first CPU 21 in a step S31. Accordingly, it is determined whether or not the initiative is present in a step S2. When the initiative is applied, a content of the key operation is determined in the step S3 and in a step S6. The determination is carried out based on the setting values in the register 21a and 21b.

When the register 21b shows "00" and the register 21a shows "1", the process proceeds from the step S3 to a step S4 on the assumption that the release button 7 is depressed. In the step S4, it is notified to the second CPU 22 that the release button 7 is operated. That is, a photographing request is output to the second CPU 22. The register 21a is reset in a step S5, and the process returns to the step S1 upon completion of the process in the step S5.

When the register 21a shows "0" and the register 21b shows "11", the process proceeds from the step S6 to a step S7 on the assumption that the normal photographing mode is selected by the mode change switch 9 in a state that the immediate photographing mode is selected. In the step S7, the process inquires of the second CPU 22 a state of a flag F owned by the second CPU 22. The flag F is validated in the immediate photographing mode, shows "1" when the compressed image data is stored in the compressed data storing area 4b, and shows "0" when the compressed data storing area 4b is vacant.

A state of the flag F is determined based on a state signal sent back from the second CPU 22 in a step S8. Herein, if the flag F is "1", the process directly returns to the step S1 on the assumption that the compressed image data is remained in the compressed data storing area 4b and a photographing mode is not to be changed. Therefore, the mode changing operation this time is invalidated. On the other hand, if the flag F is "0", it is notified to the second CPU 22 in a step S9 that the normal photographing mode is selected. That is, a changing request to the normal photographing mode is output to the second CPU 22. In a succeeding step S10, the register 21b is reset, and the process returns to the step S2 upon completion of the process in the step S10.

When the register 21a shows "0" and the register 21b shows "01", the process proceeds from the step S6 to a step S11 on the assumption that the immediate photographing mode is selected by the mode change switch 9 in a state that the normal photographing mode is selected. It is notified to the second CPU 22 that the immediate photographing mode is selected in the step S11. That is, a changing request to the immediate photographing mode is output to the second CPU 22. In a succeeding step S12, the register 21b is reset, and the process returns to the step S1 upon completion of the process in the step S12.

Next, by reference to FIG. 3, a description is made with regard to a process of the second CPU 22 when the immediate photographing mode is selected. The process starts in response to the step S11 process shown in FIG. 11. Firstly, the process sets the flag F to "0" in a step S21, and applies the initiative to the second CPU 22 in a step S22. The initiative moves from the second CPU 22 to the first CPU 21.

It is determined whether or not there is an inquiry from the first CPU 21 in a step S23. If there is the inquiry, the state signal showing a state of the flag F is sent back to the first CPU 21 in a step S24, and the process returns to the step S22 later. When there is no inquiry from the first CPU 21, YES is determined in the step S24, and a state of the flag F is determined in a step S26. Then, when the flag F shows "0", the process directly returns to the step S22 on the assumption that the compressed data storing area 4b is vacant.

The process proceeds to a step S25 when there is no inquiry from the first CPU 21 so as to determine whether or not any notification (photographing request or changing request) is applied from the first CPU 21. When the notification is applied, the initiative is obtained in a step S31, and a content of the notification is determined in a step S32. If the content of the notification is a request to change from the immediate photographing mode to the normal photographing mode, NO is determined in the step S32, and the process shown in FIG. 3 is terminated so as to start a process of the normal photographing mode not shown.

On the other hand, if the content of the notification is a photographing request, YES is determined in the step S32, and the photographing process is carried out. Firstly, a CCD imager 1 is activated in a step S33, and one frame of photographing is performed. Image data of an object photographed is stored in an image data storing area 4a of the SDRAM 4. Subsequently, an image compression circuit 6 is activated in a step S34 so as to compress the image data and store the compressed image data into the compressed data storing area 4b. The image data stored in the image data storing area 4a is read out by the memory control circuit 5, and subjected to a JPEG compression by the image compression circuit 6. The compressed image data obtained by the JPEG compression is stored into the compressed data storing area 4b of the SDRAM 4 by the memory control circuit 5. Upon completion of the process in the step S34, the process returns to the step S22 after setting the flag F to "1" in a step S35.

When the notification is not applied from the first CPU 21, the process proceeds from the steps S25 to the step S26 so as to determine a state of the flag F. When the flag F shows "0", the process directly returns to the step S23 on the assumption that the compressed data storing area 4b is vacant. However, when the flag F shows "1", the process proceeds to a step S27 so as to carry out a recording process. In the step S27, only a predetermined amount of the compressed image data stored in the compressed data storing area 4b is recorded in the memory card 11. While a data amount of one frame of the compressed image data is several M bytes, the data amount (predetermined amount) recorded in the memory card 11 in a single recording process is some tens of K bytes. That is, the predetermined amount is smaller than the amount of one frame of the data.

Upon completion of the recording process of the predetermined amount, it is determined whether or not the recording of all the compressed image data stored in the compressed data storing area 4b is completed in a step S28. Then, if there is image data yet to be recorded, the process directly returns to the step S23. However, if there is no image data yet to be recorded, the process returns to the step S23 after setting the flag F to "0" in a step S29.

As understood from the above descriptions, the first CPU 21 determines an operation of the release button 7 which instructs to photograph an object, and issues the photographing request when the release button 7 is operated. On the other hand, the second CPU 22 photographs the object by driving the CCD imager 1 when the photographing request is issued, and stores the image data of the object photographed into the SDRAM (buffer memory) 4 in a compressed state. Furthermore, the second CPU 22 records the compressed image data stored in the SDRAM 4 in the memory card 4 predetermined amount by predetermined amount, and determines whether or not the photographing request is issued every time that the recording of the predetermined amount is completed. It is noted that the predetermined amount is smaller than the data amount of one frame of (one screen of) compressed image data.

Thus, the first CPU 21 issues the photographing request by itself, and the second CPU 22 does not require more than to determine whether or not the photographing request is issued, so that a required time for determining whether or not the release button 7 is operated is shortened. As a consequence, it is possible to shorten a required time for the recording process of the compressed image data, and it is also possible to improve a responsive characteristic toward the operation of the release button 7.

It is noted that in this embodiment, although the YUV conversion process of the raw image data and the compressing process of the image data in the YUV format are performed in a state that the initiative is obtained, it may be possible that a process until the storing process of the image data in the YUV format into the SDRAM is carried out in a state that the initiative is obtained and the compressing process of the image data and the recording process of the compressed image data are carried out predetermined amount by predetermined amount after the initiative is released. Furthermore, it may be also possible that the raw image data is stored in the SDRAM in a state that the initiative is obtained, and the YUV conversion process, the compressing process, and the recording process are carried out predetermined amount by predetermined amount after the initiative is released.

Furthermore, in this embodiment, a semiconductor memory is used as a recording medium. However, a disk recording medium such as a magnetooptical disk, a hard disk, and so on may be used in stead thereof. In addition, although a CCD-type image sensor is used in this embodiment, a CMOS-type image sensor may be used instead thereof.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera, comprising:
   an instruction key for instructing to photograph an object;
   a first CPU having a register which carries out a first determination process for repeatedly determining whether or not said instruction key is operated by checking the setting value of said register, and an issuing process for issuing a photographing request when a result of said first determination process is changed from a negative result to an affirmative result; and
   a second CPU which carries out a photographing process for photographing the object, a storing process for storing into a buffer memory image data obtained by said photographing process, a recording process for recording the image data stored in said buffer memory by said storing process into a recording medium every partial amount which is smaller than a data amount of one screen, and a second determination process for determining whether or not the photographing request is issued by said issuing process every time that a recording of the partial amount by said recording process is completed, wherein said photographing process includes a process of photographing the object when a result of said second determination process is affirmative.

2. A digital camera according to claim 1, further comprising a selection key for selecting a specific photographing mode, wherein said second CPU carries out said second determination process when said specific photographing mode is selected.

3. A digital camera according to claim 1 or 2, wherein said second CPU further carries out an acquiring process for acquiring an initiative when the result of said second determination process is affirmative, and an applying process for applying said initiative to said first CPU after said storing process is completed, and said first CPU carries out said first determination process and said issuing process when said initiative is applied.

4. A digital camera according to any of claims 1 or 2, wherein said storing process is a process of storing the image data into said buffer memory in a compressed state.

5. A digital camera according to any of claims 1 or 2, wherein said recording medium is detachable.

6. An image processing method of a digital camera provided with a first CPU having a register and a second CPU, wherein
   said first CPU carries out the steps of (a1) repeatedly determining whether or not an instruction key for instructing to photograph an object is operated by checking the setting value of said register, and (b1) issuing a photographing request when a determination result of said step (a1) is changed from a negative result to an affirmative result, and
   said second CPU carries out the steps of (a2) photographing the object, (b2) storing image data obtained by said step (a2) into a buffer memory, (c2) recording into a recording medium the image data stored in said buffer memory by said step (b2) every partial amount which is smaller than a data amount of one screen, and (d2) determining whether or not the photographing request is issued by said step (b1) every time that a recording of the partial amount is completed, wherein said step (a2) includes a step of photographing the object when a determination result of said step (d2) is affirmative.

* * * * *